United States Patent [19]
Bradley et al.

[11] Patent Number: 5,172,413
[45] Date of Patent: Dec. 15, 1992

[54] SECURE HIERARCHIAL VIDEO DELIVERY SYSTEM AND METHOD

[75] Inventors: Graham C. Bradley; Alton O. Stretton; Terry L. Leier, all of Regina, Canada

[73] Assignee: SaskTel, Canada

[21] Appl. No.: 632,122

[22] Filed: Dec. 20, 1990

[51] Int. Cl.$^5$ .......................................... H04N 7/16
[52] U.S. Cl. ........................................ 380/20; 380/5; 380/23; 455/3.1; 455/6.1; 358/85; 358/86; 340/825.31; 340/825.34
[58] Field of Search ............... 380/5, 7, 10, 20, 23, 380/25; 358/85, 86; 455/3, 5, 6, 3.1, 5.1, 6.1, 6.2; 340/825.31, 825.34

[56] References Cited

U.S. PATENT DOCUMENTS

| | | | |
|---|---|---|---|
| 3,504,109 | 3/1970 | Spencer | 358/84 |
| 4,381,522 | 4/1983 | Lambert | 358/86 |
| 4,518,989 | 5/1985 | Yabili et al. | 358/86 |
| 4,521,806 | 6/1985 | Abraham | 358/86 |
| 4,538,176 | 8/1985 | Nakajima et al. | 358/86 |
| 4,567,512 | 1/1986 | Abraham | 358/86 |
| 4,590,516 | 5/1986 | Abraham | 358/86 |
| 4,625,235 | 11/1986 | Watson | 358/86 |
| 4,709,266 | 11/1987 | Hanas et al. | 380/20 |
| 4,734,764 | 3/1988 | Pockock et al. | 358/86 |
| 4,761,684 | 8/1988 | Clark et al. | 358/86 |
| 4,763,191 | 8/1988 | Gordon et al. | 358/86 |
| 4,802,220 | 1/1989 | Marker, Jr. | 380/33 |
| 4,829,372 | 5/1989 | McCalley et al. | 358/86 |
| 4,878,245 | 10/1989 | Bradley et al. | 380/10 |
| 4,890,320 | 12/1989 | Monslow et al. | 380/10 |
| 4,916,737 | 4/1990 | Chomet et al. | 380/20 |
| 4,920,432 | 4/1990 | Eggers et al. | 358/86 X |

Primary Examiner—Bernarr E. Gregory
Attorney, Agent, or Firm—Davis, Bujold & Streck

[57] ABSTRACT

Disclosed is an improved system for the delivery of entertainment and educational programming from a plurality of electronic libraries to a plurality of users. Users actuate a hand operated control device to: review a listing of available programming; enable the delivery of a program from a library; or control the delivery of forwarding and rewinding through the programming, and authorizing the purchase of advertised consumer goods by entering in personal identification numbers. The network of libraries and the paths for delivering the programming stored therein is arranged for optimum transmission efficiency and maximum access capacity. The key idea in optimizing transmission efficiency and access capacity is to recognize that programming can be grouped into different classes, and that not all classes of programs should be stored in all libraries. High demand entertainment programming should be stored and delivered from a central source whereas low demand educational or cultural programming should be stored and delivered from a local neighborhood library where there is a special interest in such programming. The system is intrinsically secure and encryption is not required. Programs are not delivered to any physical address other than that of the ordering user. Apparatus is employed to discourage the unauthorized copying of delivered programming. The system also permits the delivery of conventional cable television signals on a competitive basis. Apparatus is employed that maximizes access capacity and minimizes investment cost.

12 Claims, 8 Drawing Sheets

SECURE HIERARCHIAL VIDEO DELIVERY SYSTEM AND METHOD

FIELD OF THE INVENTION (General) This invention relates to apparatus for use in the user initiated and controlled delivery of educational and entertainment television programming from remotely located electronic libraries, and conventional cable television sources, to the users physical location.

BACKGROUND OF THE INVENTION (Addresses Educational Needs) As residents of a community have different educational needs, and there is a need for a system for electronically delivering audio-visual educational programming from an electronic library to the learners physical location, and it is desirable to deliver educational programming when the learner desires such programming, and it is required that learners have the ability to start, stop, fast-forward and rewind the playing of such programming; apparatus is needed to provide for such requirements. This invention provides for such educational needs.

(A Form of Pay TV) Although an educational electronic library and delivery system may be publically funded by a community library or a public educational institution, the sponsoring agencies may wish to incorporate such a service on a user pay basis. In addition, private educational institutions may desire to make use of such apparatus. When so employed the system becomes a form of pay television.

(Elimination of Monopoly) Presently competing cable TV operators within a franchise area are faced with the uneconomical prospect of duplicate distribution networks. Usually this has resulted in an avoidance of competition, the result being that a single operator monopolizes the distribution of cable TV programming within a franchise area. Potential competing operators are discouraged from entering into competition within a franchise area as the duplicate distribution network has a potential of only 50% of the return of a monopoly franchise area of equal investment cost. It is observed that approximately 15% of the capital investment in a cable TV distribution system is in primary trunking costs compared with 85% in the secondary distribution network. If the secondary distribution network could be made available for use by competing cable TV operators and duplication of same avoided, then the probability of a plurality of cable operators competing for business within an area becomes economically feasible.

(Accessability Limits) An educational electronic library and delivery system requires the ability to provide all residents of an urban society, who have a desire to access and a means to pay for such educational services, the ability to access the widest possible variety of programming at the time desired with the minimum of conflict between users. All pay TV systems employed to date severely restrict user choice as the apparatus provided is limited in its capacity to simultaneously access and deliver the required quantity and variety of programs.

(Prior-Art-Bradley, switching/bus techniques) Most cable TV systems in use today frequency division multiplex a plurality of subscription television channels and a plurality of pay per view channels onto a single coaxial cable for transmission and distribution to residences. A few also allocate some channel capacity for the transmission of user selected video-on-demand programming from a central library to user's residences. An example of such apparatus is given in an associate prior patent, Bradley, Stretten, Stretten and Wentzel (U.S. Pat. No. 4,878,245). The prior Bradley et al. patent teaches that user programming choice can be expanded by using the same radio-frequency TV channels to carry different programming by separating duplicate frequencies onto a plurality of physically separate transmission paths, each path serving a separate group of subscribers, where each user controls a radio frequency isolation switch to permit the user to access extra channels when desired.

In a previous associated patent, Bradley, Stretten, Stretten and Wentzel (U.S. Pat. No. 4,878,245), each community of about 100 homes was provided an individual fiberoptic fiber as the transmission facility from a central electronic library to the community. With this previous proposed arrangement the quantity of programs that could be simultaneously delivered is restricted by the capacity of the fiber link. Also if a single library serves the entire urban centre, many of the communities of 100 homes would be very distant from the library making the cost of adding additional fiberoptic transmission facilities expensive. In addition different communities have different educational and cultural needs. For example, an Italian community would want programming different than a Hispanic community, a low income community would have a greater need for basic job skills programming than a high income community. Therefore, it would be more efficient to store and transmit special interest programming from a library located in the neighborhood community than transmit such programming over a long distance from the central library. This previous proposal suggests no alternative to a single centralized electronic library.

Programming should therefore be classified and distributed among a network of libraries in order to reduce implementation cost and improve transmission efficiencies. Programming for which there is a common interest, and high demand, should be distributed from a central library. Programming of local interest and modest demand should be stored and distributed from libraries located in the neighborhood community. Programming of common interest but very low demand should be distributed from the central library for short term storage at a local library where it is available for user access and control. The apparatus embodied herein improves upon the distribution efficiency by taking into consideration the differing nature of and demand for programming.

(VCR Like Control) In addition our previous embodiment provided user control of only the starting of the delivery of a program. No means is provided for the user to control the stopping, fast forwarding, rewinding, or replaying of a program. As the educational user needs to have access to the ordering and control link at all times to permit control over the delivery of the programming an alternative to the public telephone network, as proposed in our previous patent, was required in order to avoid telephone facility blocking problems.

(Control Path Blocking) Another object of this invention is the provisioning, for each of a plurality of users, an ordering and control link that is effectively available for user at all times, and that is intrinsically secure.

The provisioning of the start/stop, wind/rewind feature is another reason for not locating educational programming at the central library as learners could tie up expensive, long transmission facilities for extended periods of time.

(Prior Art Sub-Centres) Nakajima et al (U.S. Pat. No. 4,538,176) and Yabicki et al (U.S. Pat. No. 4,518,989), proposed an electronic library system with optional sub-centres located between the location of where the video/audio files are stored and the end user. The purpose of sub-centres is to reduce the cost of potentially long transmission lines from the central program file to the end user. Sub-centres do not store files for direct access by users but only have buffer memory capability to permit high speed transmission from the central file and the sub-centre and real-time retransmission to the user. The apparatus as embodied in both patents fails to address the special needs of educational programming services, the savings realized by storing some programs near the physical location of the end user and other programs at a central location, and the congestion problems associated with the use of the public telephone network for control and ordering.

(Security) Most pay TV systems, including the Bradley et al previous embodiment, simultaneously deliver the same programming to a plurality of physical location within the unique fiberoptic fed neighborhood. Our previous embodiment uses a combination of filters and switches to block the delivery of programs to a potential users television receiver should the potential user not wish to pay for the programming. Physical security means are required to prevent unauthorized users from receiving the pay programming by tampering with the filters and switches. Occasional physical inspection is required to deter tampering. Most other pay TV systems use addressable encryption or jamming apparatus to prevent programming, for which a potential user has decided not to pay or is not permitted to purchase, from being intelligently received. The three most common methods of defeating such apparatus are; by transferring the internal unique descrambler identity keys from an authorized unit to an unauthorized unit thus making both units identical as far as addressing signals are concerned, by extracting the decoded descrambling keys from an authorized descrambling device and programming into an unauthorized descrambler; by relocating an authorized descrambler from a physical location where it is permitted to be used to a location where it is not (for example, from a private residence where private viewing is permitted to a public establishment where public viewing is denied).

Each of the above security systems have only a limited lifetime. Some months or years after installation methods of defeating the apparatus become widespread and the system operator is required to change out the security apparatus. Another object of this invention is the proposal of a security method that is intrinsically secure, that does not require the use of encryption or jamming apparatus.

This embodiment improves upon the security method embodied in our previous patent by moving the point of programming denial into a single secure neighborhood building or structure, thus eliminating the need for physical inspection of a plurality of apparatus distributed throughout the neighborhood.

(Bulk Problems) The disadvantage of feeding every user location from a single neighborhood distribution point is that should coaxial cable be used the physical bulk of the cable becomes a burden.

This embodiment improves upon Nakajima and Yabicki by using conventional telephone paired copper wires, or low cost fiber optics as the transmission medium from the neighborhood library to the users physical location. Should the length of the transmission line from the local library to the user's location be less than typically 2 km., then the video and audio signals are transmitted via conventional telephone cable, one pair for the video and one pair for the audio, from the local library to the home. Should the distance be longer or a higher bandwidth be required (for the simultaneous transmission of 2 to 4 Amplitude Modulated Vestigial Sideband (AM VSB) RF channels), then this embodiment proposes the use of a low cost optical transmission line consisting of a low cost optical energy source, and a relatively low bandwidth, high loss fiber. By using paired telephone cable or optical transmission, as opposed to coaxial cable transmission, the physical bulk of the cabling can be reduced as both are small compared with that of conventional coaxial cable transmission systems.

Nakajima and Yabicki, indicates the use of electrical transmission methods. They require no encryption or jamming apparatus but either they must utilize a greater number of subcentres which expands their physical security needs, or cable bulk becomes a problem; a problem that they have failed to address.

(Prior Art Problems-security/blocking) Typical examples of user controlled video-on-demand pay TV system are that outlined by Monslow et al. (U.S. Pat. No. 4,890,320) and Abraham (U.S. Pat. No. 4,590,516; 4,567,512; and 4,521,860). Both the Maslow and Abraham apparatus combine a plurality of user ordered programming for multiplexed transmission over a conventional cable TV system from a video library source to a user's residence, and at each of the plurality of physical locations to which the programming is delivered is located a device to permit the intelligent viewing of only programs so ordered from that location. Both fail to consider the problem of migrating receiving apparatus. This is a serious concern as a descrambler located at a user's private residence which is authorized to receive a boxing match, for example, may be relocated for use to a public establishment where viewing of the match is not authorized. Both propose the use of the public telephone network as the ordering link between the subscriber's residence and the library. The use of both the public telephone network and a conventional CATV distribution system represent potential blocking problems. Congestion can appear in both the ordering path and the delivery path.

(Non Blocking Need) Another object of this invention is to design a delivery path that is expandable on an as required basis to ensure that as the demand for programming grows the system is capable of being modified to meet the demand.

(Copy Protection) A concern of programming copyright owners is that electronically delivered programming once received can be recorded and copied for unauthorized distribution. Present art discourages recording by altering the nature of the video signal such that subsequent recording is interfered with. Users who wish to make a business out of such a practice use video signal restoration apparatus to restore the video signal to a recordable form thus defeating the copy security system. Another object of this invention is a system of imbedding in the video signal information that allows the user responsible for the unauthorized distribution practice to be determined.

(Payment Responsibility) Another object of this invention is apparatus for securely enabling the purchasing of programming and/or consumer goods. The implementation of such a feature requires that the physical location of the user be correctly identified and is free from tampering, and that the personal identification of the ordering user be identified and valid for the ordering address. The purpose being to minimize problems associated with users denying responsibility for payment.

SUMMARY OF THE INVENTION

The objects of the invention are as follows:

1. To economically and efficiently provide for the educational and entertainment needs of an urban centre by providing the required access to a plurality of electronic programming by a plurality of residences, businesses and schools located throughout the urban centre, with a minimum of conflict between the needs of the plurality of users.

2. To provide for the educational and entertainment needs of an urban centre by providing end users with the ability to select programming for delivery to their location when they require it.

3. To provide for the educational and entertainment needs of an urban centre by providing end users with the ability to start, stop, replay, rewind, and fast forward programming as their needs require.

4. To provide for the economic needs of an educational and entertainment pay television system by providing for the needs of the system to confirm the identity of an ordering user for the purpose of charging for access to and use of programming.

5. To secure the delivery of programming, without the use of encryption or jamming apparatus, such that programming being ordered by, paid for, and delivered to an authorized user's physical location can not be received at a non-paying unauthorized user's physical location.

6. To minimize the construction cost associated with each user's physical location being individually fed from a central community access point.

7. To provide for a means of discouraging unauthorized copying and distribution of delivered programming.

8. To provide for the economic needs of a pay television system by providing for the needs of the system to confirm the identity of a purchasing user for the purpose of charging for consumer goods sold through the use of the system.

9. To provide for the economic needs of a plurality of cable TV undertakings competing within a given cable TV franchise area.

In accordance with one aspect of the invention there is provided a secure, hierarchial, video-on-demand television signal distribution network having at least one local community library serving a plurality of geographically proximate subscribers, each community library providing at least one video distribution bus for attachment of a plurality television channel tuners, one tuner for each subscriber, to tune a selected television channel on said video distribution bus for delivery of the tuned television signal over dedicated television signal delivery lines to the subscriber, each said library having: a plurality of television program record and playback units for recording television programming and playing back previously stored television programming, each television program record and playback unit provided with a channel tuner for tuning a television channel to be recorded and further provided with a tuneable television signal modulator for modulating the playback television signal to a selectable channel, each modulator terminated on said video distribution bus; and a user control signal path for carrying user selection and control data from the subscriber premises to the local community library whereby the user programming choices and control may be acted on by the local library in response to user input to select or control the television signal to be delivered or being delivered to the user over the dedicated television signal delivery line serving the user; and a central library serving said local libraries having a wide bandwidth television signal delivery link extending therebetween for delivery of television programming to said local libraries for storage on said program record and playback units or for delivery to a user served by said local library, further including a control data communications path extending between said central library and each said local library whereby user selection and control signalling may be effected co-operatively by the central and local library.

BRIEF DESCRIPTION OF THE DRAWINGS

In the drawings, which illustrate embodiments of the invention.

DESCRIPTION OF THE PREFERRED EMBODIMENT

Figure 1:
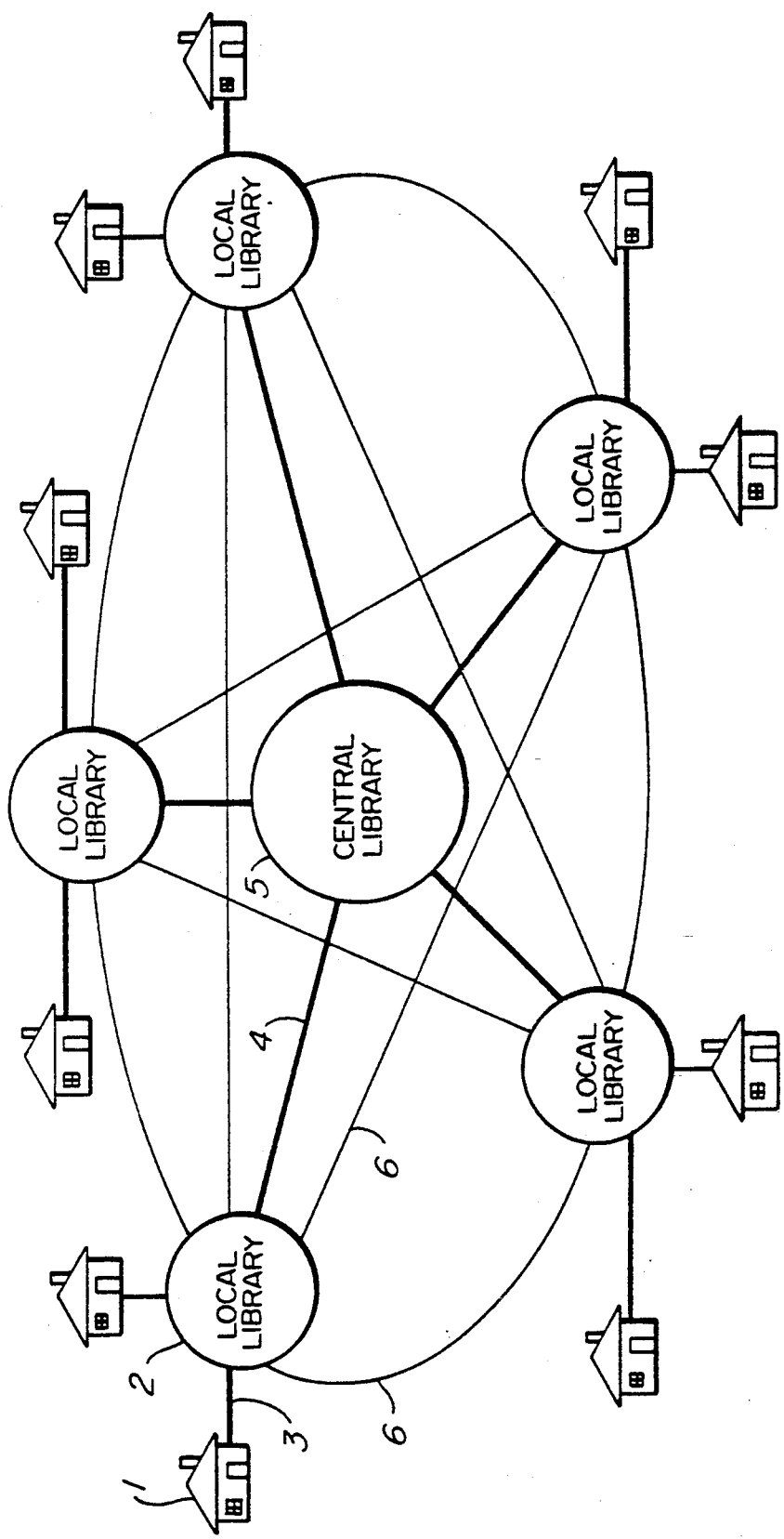
FIG. 1 is an overview of the embodied hierarchial network of electronic libraries.

With reference to FIG. 1 there is shown an overview of the hierarchial network of electronic libraries. A typical user's residence 1 is shown, alternately an educational institution classroom could be substituted. The user shown receives television signals from a local electronic neighborhood library 2. The neighborhood library is typically located within 2 kilometers of the user's location. User requested television programming is transmitted from the local library to the users location over a dedicated television signal delivery line 3. Preferably this transmission line is conventional telephone cable or a low cost, low bandwidth fiberoptic fiber, although a narrow bandwidth minature coaxial cable could be substituted. A plurality of high capacity, wide bandwidth television signal delivery links 4, preferably, fiberoptic fibers, connects the local library with the central library 5. These high channel capacity wide bandwidth television signal delivery links are used to transmit low demand and/or local interest programming from the central library to the local library for storage at the local library, said local library stored programming is available for subsequent access by neighborhood users such as 1 homing on said local library. Said fiberoptic link is also available for the distribution of general demand, high interest programming, said programming is available for direct access by users from the central library without storage at local libraries. A plurality of fiberoptic links 6 is also provided for the purpose of permitting users to access programming stored at any of the plurality of local neighborhood libraries.

We have discovered that to maximize video access and control for users while minimizing the investment necessary to provide the user desired control and variety of programming, it is useful to categorize or classify the programming into categories referred to herein as Class "A" Video on Demand (Class "A" VOD), Class "B" VOD and Class "C" VOD. Other classes may arise, however, the above 3 are fundamental to understanding the configuration of apparatus described in accordance with the present invention.

Type "A" VOD programming is indicated by a stored video program sought to be individually controlled by the user to permit pausing, rewinding, fast-forwarding etc. of the actual program source where the program source is, from a network contention point of view, low demand. That is, the chance or incidence of 2 or more users simultaneously seeking access to the video program is small. Examples of this type of programming are educational movies used by the teacher or instructor to assist in the delivery of educational information to students. The teacher needs to pause the movie to permit dialogue at critical points and to rewind the movie to allow previous points to be reviewed etc. Also in this category of video program would be cultural or special interest titles (i.e. yesterday's broadcast news).

Type "B" VOD programming is indicated by a stored video program sought to be individually controlled by the user to permit pausing, rewinding, fast-forwarding etc. of the actual program source where the program source is, from a network contention point of view, high demand. That is, the chance or incidence of 2 or more users simultaneously seeking access to the video program is large. Examples of this type of programming are new release movies for which there is a general pent up demand for viewing. The user of such a movie would prefer to select the title to be viewed and have the commencement time be as close to the request as possible, i.e. be viewed on demand. It is also preferable to allow such a user to have the ability to rewind or backup the movie to review missed spots or to fast-forward the movie to advance to a desired subsequent portion.

Type "C" VOD programming is indicated by a video program that may be live or stored but is not individually controlled by the user, where the program source is, from a network contention point of view, high demand. That is, the chance or incidence of 2 or more users simultaneously seeking access to the video program is large. Examples of this type of programming are traditional broadcast TV carried on the cable media, live events such as sports events or national addresses by the Government or a public agency etc. The user of such a video program prefer to select the content or title to be viewed and have the event unfold with any other involvement.

Figure 2:
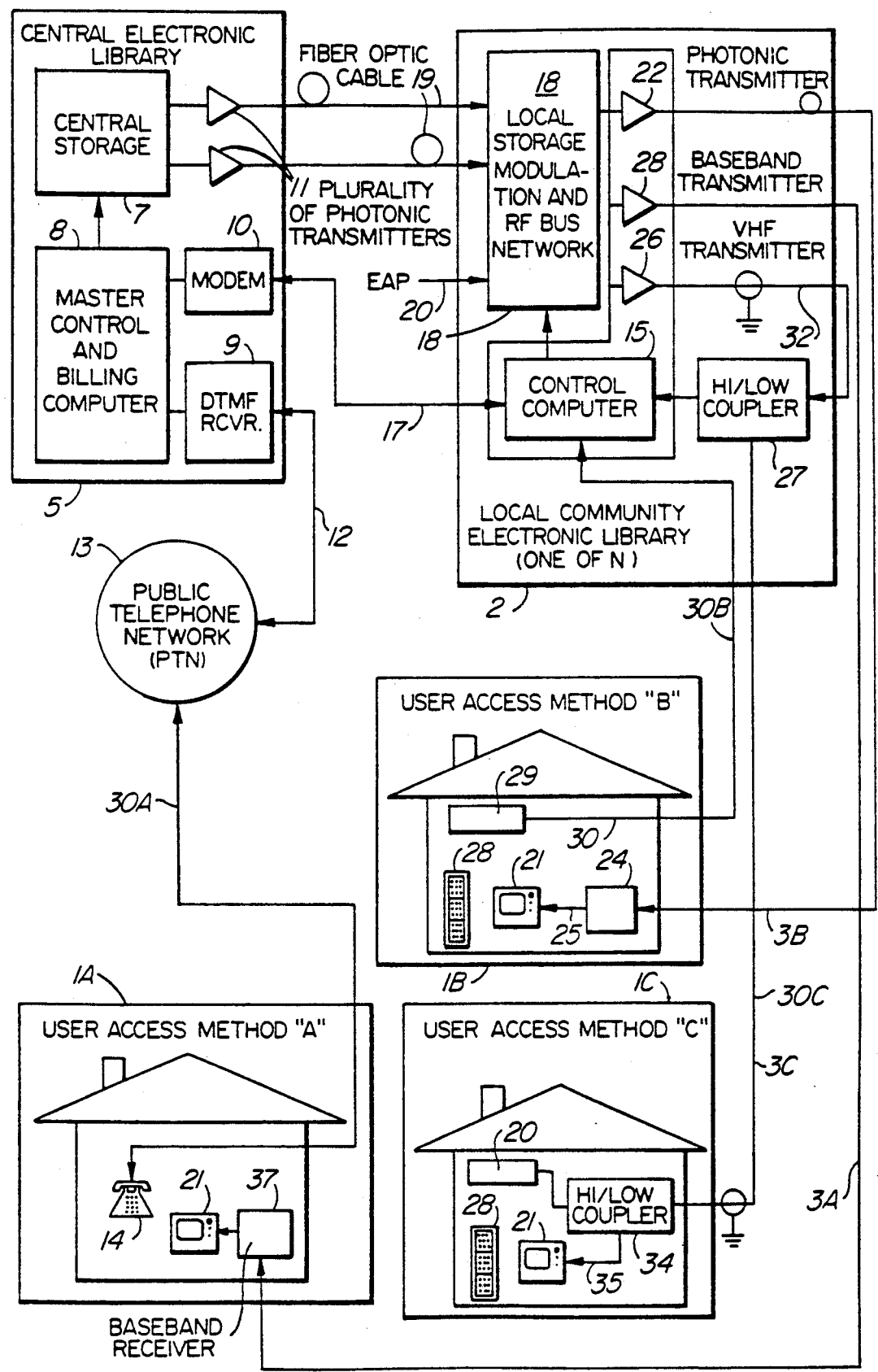
FIG. 2 is a functional block diagram that shows, the interconnection of the major components of the hierarchial network of electronic libraries, and the identification of the major components of the central electronic library, the neighborhood local library and the apparatus located at user's residences.

FIG. 2 shows the interconnection of the major components of the hierarchial network of electronic libraries, and the identification of the major components of the central electronic library, the neighborhood local library and the apparatus located at user's residences. It also shows three different embodiments of user control signal paths and three different embodiments of the dedicated television signal delivery lines.

With reference to FIG. 2 there is shown the central library 5. The central library contains three basic types of apparatus, the central storage and playback apparatus 7 where programming is stored on a variety of media, magnetic tape, laser discs, and computer memory, for subsequent transmission to local libraries, the master control and billing computer 8 which records user usage for billing purposes and controls the starting and stopping of the video/audio storage and playback apparatus located in the local library. Also shown is the interface apparatus 9, 10 and 11 for receiving and transmitting electronic transmissions from and to a plurality of user's telephone instruments 14 and a plurality of local neighborhood libraries. A plurality of Dual Tone Multifrequency (DTMF) Receivers 9 receives user command signals via conventional telephone cable 12, using a dial up public switched telephone network (PSTN) 13 that links the central library 5 to a plurality of user's telephone sets 14 located at a plurality of user's physical locations 1A. The master billing and control computer 8 transmits voice coded computer information via 12, 13 and 14 to assist the user in inputting commands, using methods known to those versed in the art. A plurality of control data communications modems 10 are incorporated to enable the high speed transmission of data signals to and from a plurality of local library control computers 15 located in each of a plurality of local electronic libraries 2. For security reasons, the control data communications path 17 is preferably a dedicated voice circuit assigned by the telephone carrier; by way of illustration, it is shown as a copper conductor cable. The data link transmits usage data and control commands from the local library to the central library, and control commands from the central library to the local library. The control commands transmitted from the central library master computer determine what programming is stored on what storage/play device located at the local library. A basic component of the local library is a local storage, modulation and RF bus network 18, said network has as input television program signals, both Class A, and Class B Video on Demand (VOD) signals transmitted to it via a plurality of fiber optic transmission facilities 19, and a plurality of television signal equal access points (EAP) 20 that may be used by television programming providers to distribute their programming over the network.

If the number of record/store/playback apparatus provided at a local library is n units, the number of record/store/playback apparatus storing programming and available for access by users at any one time is n-x units. The specific x units of apparatus not available for access at any given point in time are alternately available for the purpose of recording programming being downloaded to the local library from the central library. Thereby permitting the infinite discreet rotation of available programming over time.

Example user locations 1A, 1B, and 1C terminate the reception of transmitted programming at the user's television receiving apparatus 21. Programming is transmitted to each user's location using the most economical of the following transmission means, fiber optics, coaxial cable, or paired copper conductor.

In user access method "A", twisted pair copper conductor 3A is employed as the dedicated television signal transmission line between the local library 2 and each of the plurality of neighborhood user locations 1A. Baseband video transmitter 28 is designed to pre-emphasize the transmitted baseband video signal to compensate for high frequency capacitive roll-off effects and possible color subcarrier intermodulation distortion that will be introduced by the twisted pair copper conductor 3A when used as the transmission medium for the high frequency signals of the base band video signal. The so conditioned video signal is then amplified and converted to a balanced impedance relative to ground output by video baseband transmitter 28 and carried to a user location. The associated audio signal being amplified and applied in a balanced to ground configuration to a second telephone cable pair (not shown) for simultaneous transmission to said user's location. At said user's location the separate audio and video signals are AM VSB modulated onto an RF carrier by Baseband Receiver 37 for subsequent reception by user's TV receiving apparatus 21.

User generated control and selection signals are transmitted from the user location to the local library control computer by using public switched telephone network 13 by dialling the master control and billing computer 8 and using the dual tone multifrequency (DTMF) tones produced by the telephone 14. The origin of the programming selection and control signalling being received by the master billing and control computer is assured by employing one of two possible methods. Firstly, the user may be required to enter an identity and/or security code known only to the user served by dedicated television delivery path 3A. Alternately, the billing and control computer can be equipped to identify the incoming caller by using automatic number identification (ANI) used, for example, in toll billing for long distance calls.

In User access method "B", fiber optics is employed as the dedicated television signal transmission line between the local library 2 and each of the plurality of neighborhood user locations 1B. This configuration is the preferred embodiment of the dedicated television signal transmission line 3B as it provides the most bandwidth to each user with the least amount of cable bulk at the local community electronic library 2 end. Radio frequency television signals are modulated onto a lightwave medium via a plurality of photonic transmitters 22. The transmitted optical signal is received from the fiber optic dedicated television signal transmission line 3B by photonic receiver 24. Photonic receiver 24 converts the received optical signal into a radio frequency signal which is transmitted to the user's TV 21 via coaxial cable 25.

User input to the network for selection and control of the programming being received or being selected to be received can be communicated to the control computer via the user's telephone set located at the user location 1B (not shown, but see 14 in user access method "A"). Alternately, programming selection and control signals can be communicated to the control computer 15 through user operation of a wireless transmitter 28 which transmits a low data speed wireless signal to wireless receiver 29. Wireless receiver 29 then converts the wireless signal to an electrical signal for transmission over a user control signal path 30B, which is a copper transmission path that is dedicated to the individual user. Thus the origin of the programming selection and control signal is assured by the immovable physical path in the form of a dedicated user control signal path 30B.

In user access method "C" coaxial cable is employed as the dedicated television signal transmission line 3C between the local library 16 and each of the plurality of neighborhood user locations 1C. Radio frequency television signals are amplified for transmission by a plurality of transmitters 26, coaxial cable 32 connects said amplifier apparatus to the high frequency transmit port of High/Low Coupler 33, coaxial cable 3C connects the high frequency output port of High/Low Coupler 27 to the high frequency input port of High/Low Coupler 34, and coaxial cable 35 connects the high frequency output port of High/Low Coupler 34 to user's television receiving apparatus 21. Selection and control signals can be communicated to the control computer 15 through user operation of a wireless transmitter 28 which is connected to the low frequency input port of the High/Low Coupler 34 where the user control signal path 30C is carried in the reverse direction on the coaxial cable to High/Low Coupler 27 the low frequency output port of which is connected to the local control computer 15. Thus, in this configuration, the coaxial cable 3C is a 2 way transmission apparatus with the high frequency TV signals going in one direction and the low frequency user control data signals going in the other direction, a technique that is well known to practitioners of the art. Thus the origin of the programming selection and control signal is assured by the immovable physical path in the form of dedicated coaxial cable 30C.

It will be understood that user input to the network for selection and control of the programming being received or being selected to be received can be communicated to the control computer via the user's telephone set located at the user location 1C (not shown, but see 14 in user access method "A"). In such a case, the need for High/Low Couplers 34 and 27 at each end of the coaxial cable 3C is eliminated as the coaxial cable is no longer a 2 way transmission apparatus; it is reduced to carrying high frequency TV signals in one direction only.

Figure 3A:
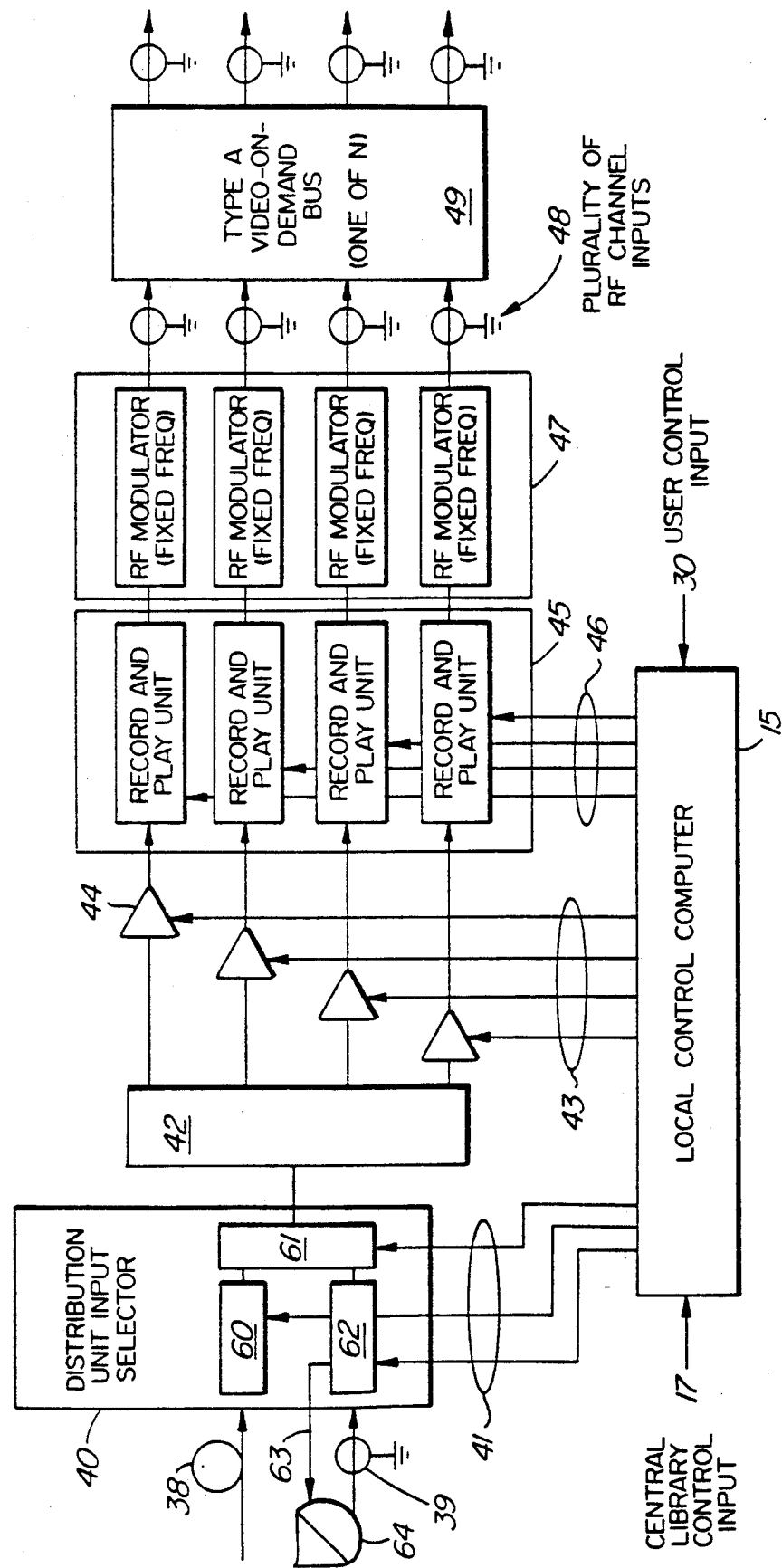
FIGS. 3A and 3B are functional block diagrams that show the apparatus for formulating and multiplexing, Type A Video-on-Demand (VOD) signals onto one of a plurality of Type A Buses, Type B Video-on-Demand (VOD) signals onto one of a plurality of Type B Buses, and the method of providing a low cost opportunity for one of a plurality of cable TV operators to have access to a dedicated Type C bus.
Figure 3B:
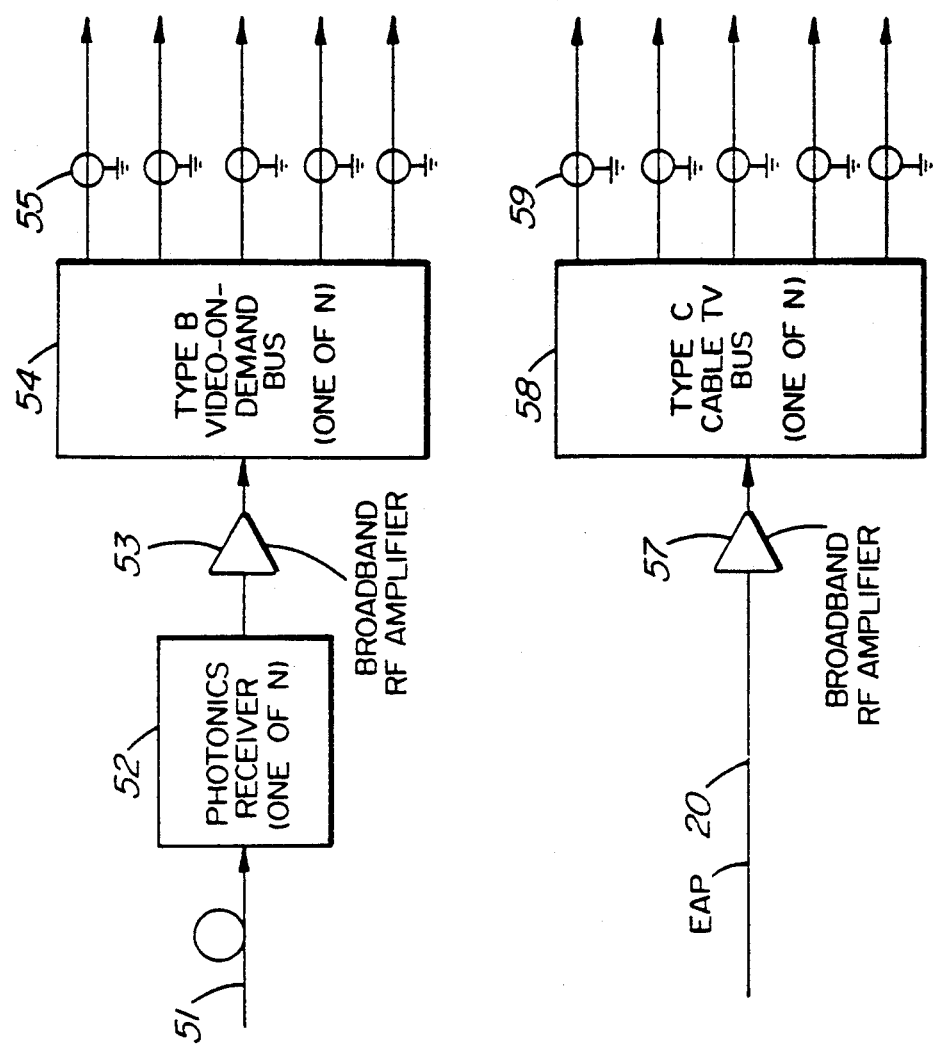

Referring now to FIGS. 3A and 3B which shows the apparatus for formulating and multiplexing Type A Video-on-Demand (VOD) signals onto one of a plurality of Type A Buses, for formulating and multiplexing Type B Video-on-Demand (VOD) signals onto one of a plurality of Type B Buses, the method of eliminating the cable TV monopoly by providing a low cost opportunity for each cable TV operator to have dedicated access to one of a plurality of Type C buses and providing the opportunity for users to select the bus and cable TV programming of their choice.

With reference to FIGS. 3A and 3B there is shown the apparatus for receiving programming transmitted to one of a plurality of local neighborhood electronic libraries, and the apparatus for processing said programming for subsequent distribution on radio frequency distribution busses.

Shown is one of a plurality of Type A Video-on-Demand Buses, one of a plurality of Type B Video-on-Demand Buses, and one of a plurality of Type C Cable Television buses.

Type A programming is stored for access by users in a video library comprising a plurality of record and playback units 45. At any period in time, some of the record and play units are off-line and not available for access by users; said units are available at that time for receiving and recording programming downloaded from the central library. By so doing the Type A VOD programming available at a local library is continually being changed, and by said continuous change the capacity of the transmission facility from the central library to the local library for Type A VOD programs need not be large. Said transmission facility is labelled as 4 in FIG. 1, and as 38 in FIG. 3A and is shown as a single fiber optic fiber. A fully equipped single fiber has a capacity as high as 864 program down loads per day with each program being 2 hours in duration and download being in real time, a minimum equipped fiber would have a capacity of 12 downloads per day of 2 hour programs at real time. The fully equipped fiber carries 72 television channels and the minimum equipped fiber 1 channel.

Should the facility be a coaxial cable transmission line from the central library, or a coaxial cable feed from a source other than the central library such as a television receive only satellite earth station, the facility is shown as 39 in FIG. 3A.

All programming selection, recording and playback operations are controlled by information received by the local library control computer 15 from either the master control and billing computer 8 via control data communications path 17, or the User via the user control data signal path 30, as previously described in reference to FIG. 2 describing embodiments 30A, 30B and 30C.

The central library Master Control and Billing Computer 8, in FIG. 2, transmits signals on control data communications path 17 advising the local control computer 15 to ready recording apparatus for the reception of Type A VOD programming about to be downloaded to said local library 2 on fiber optic link 38; it also instructs the Local Control Computer 15 as to which one of a plurality of record units 45 the programming is to be recorded on, and informs the Local Control Computer 15 as to the radio frequency television channel the program will be transmitted on.

For example, should the programming be transmitted on fiber optic feed 38, the Local Control Computer 15, having previously been advised of said transmission by Master Control and Billing Computer 8 over control data communications path 17, sends control data via input selector control signal path 41 to the input selector 40 to enable reception of programming from said fiber optic feed 38 and internal photonic receiver circuitry 60 so as to receive a plurality of television signals, electrically formulated, by way of example, as radio frequency amplitude modulated vestigial side band (AM VSB) signals; said RF signals are fed to distribution unit 42 via selector switch 61, said distribution unit 42 distributes said signals to a plurality of tunable, addressable demodulators 44. Said tunable demodulators are controlled by the Local control computer 15 via tuneable, addressable demodulator control path 43, the audio and video outputs of said demodulators is applied to the input of one of a plurality of record and playback units 45. Local Control Computer 15 controls the recording operation of the record and playback units 45 over control path 46. Upon reception of a user request signal on of a plurality of user control signal paths 30, said Local Control Computer 15 transmits a play signal to the record and playback units 45 stores information as what program was ordered by what user and the time and date of the request, said ordering information is subsequently transmitted via control data communications path 17 to the Master Control and Billing Computer 8 in FIG. 2. Video and audio signals corresponding to said programming request are modulated by the RF modulator 47 associated with the record and playback unit 45 playing said requested programming. Typically each of the plurality of Type A RF Buses 49 could carry up to 72 separate simultaneous programs. Each of said busses 49 has a plurality of outputs one of which is dedicated to each of the plurality of user locations 1 associated with said local neighborhood library 2. Typically, there are up to 600 user locations fed from each local neighborhood library.

The central library's Master Control and Billing Computer, 8 in FIG. 2, transmits signals on control data communications path 17 advising the local control computer 15 to ready recording apparatus for the reception of Type A VOD programming about to be received by said local library 2 from satellite receiving antenna system 64, it also instructs the Local Control Computer 15 as to which one of a plurality of record units 45 the programming is to be recorded on. For example, should the satellite television programming be received on coaxial cable 39, the Local Control Computer 15, having previously been advised of said transmission by Master Control Computer 8 over control data communications path 17, sends control data to the input selector 40 to enable reception of programming from said coaxial cable 39, said input selector switch tunes its internal satellite receiving apparatus 62 via control signal path 41 so as to receive an audio and a video signal. Said tuning signals received by input selector 40 over control signal path 41 control the positioning of the satellite receiving antenna, polarization selection, and video and audio subcarrier selection. Antenna positioning control signals are transmitted to satellite antenna 64 by control path 63. Said video/audio signals are VSB AM modulated by the satellite receiving apparatus onto an RF television channel carrier and distributed to a plurality of tunable, addressable demodulators 44 and subsequently to a plurality of record and playback units 45. Local Control Computer 15 controls the digitally controlled tuner/demodulator 44 over control path 43, and also controls the recording operation of the record and playback units 45 over control path 46. Upon reception of a user request transmission over one of a plurality of user control signal paths 30, said Local Control Computer 15 addresses the desired record and playback unit 45 and transmits a play signal to said addressed unit, said unit stores the transmitted program. Video and audio signals corresponding to said programming request are modulated by the RF modulator 47 associated with the record and playback unit 45 playing said requested programming. Typically, each of the plurality of Type A RF Buses 49 could carry up to 72 separate simultaneous programs. Each of said busses 49 has a plurality of outputs one of which is dedicated to each of the plurality of user locations 1 associated with said local neighborhood library 2. Typically, there are up to 600 user locations fed from each local neighborhood library.

The central library's Master Control and Billing Computer 8, in FIG. 2, transmits signals on control data communications path 17 advising the local control computer 15 as to the name and duration, and channel assignments given to Type B Video-on-Demand programming about to be or being transmitted from the central library 5 to the local neighborhood library 2 for access by users 1 via one of a plurality of Type B distribution busses 54. The typical duration of each Type B VOD program would be about two hours. Typically, each of a plurality of Type B programs would be transmitted on 24 different radio frequency television channels with the start time of transmission being delayed 5 minutes from the start of the first transmission to the start of the second, and being delayed 5 minutes from the start of the second transmission to the start of the third transmission, etc. The purpose of so doing is to provide the user with the ability to effectively pause his or her reception of said programming 5 minutes, 10 minutes, 15 minutes, etc., so as to permit the user with the opportunity to replay programming or to take a break from viewing. Typically 72 RF TV channels would be received on each fiber, or 1 fiber has the capacity to carry 3 separate Type B Video-on-Demand programs, where each of said programs offers said 24 separate viewing opportunities spaced 5 minutes apart in playing time. The preferred embodiment is for each fiber to carry the 72 channels in a VSB AM frequency division multiplex form, with each of said 72 channels being modulated onto different television channel. Channel frequencies are repeated on fibers feeding different Class B buses. The photonics receivers 52 converts the signals from optical to electrical form. The broadband RF amplifiers 53 each amplify the 72 TV channels prior to their being combined onto the radio frequency distribution bus 54. Each of said busses 54 has a plurality of outputs one of which is dedicated to each of the plurality of user locations 1 associated with said local neighborhood library 2. Typically there are up to 600 user locations fed from each local neighborhood library.

Referring to the Type "C" Cable TV BUS portion of FIG. 3, there is shown a television signal equal access point 20 which allows equal access by television programmers to distribution of their television signals by the network. The preferred embodiment is for each equal access point to be a single coaxial cable type feed for carrying 1 to 72 channels in a VSB AM frequency division multiplex form to broadband amplifier 57, with each of said 1 to 72 channels being modulated onto different television channel. Channel frequencies are repeated on different coaxial cables feeding different Class C buses. The broadband RF amplifiers 57 each amplify the 72 TV channels prior to their being combined onto the radio frequency distribution bus 58. Each of said busses 58 has a plurality of outputs 59 one of which is dedicated to each of the plurality of user locations 1 associated with said local neighborhood library 2. Typically there are up to 600 user locations fed from each local neighborhood library.

Figure 4:
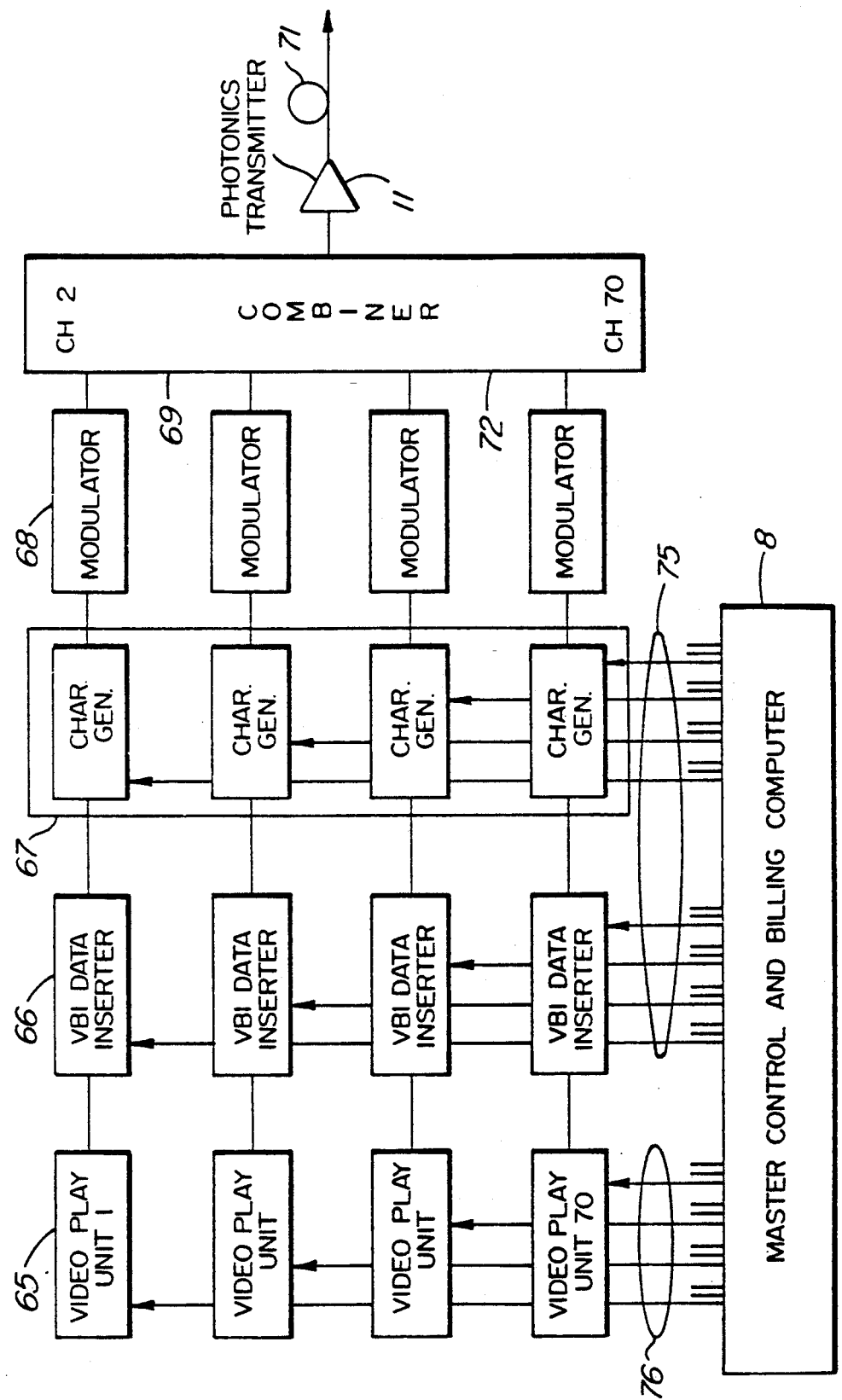
FIG. 4 is a functional block diagram that shows the central library apparatus for inserting identification information for the purpose of identifying the source of unauthorized duplication of Type B VOD programming for commercial profit purposes.

FIG. 4 shows the central library apparatus for inserting identification information for the purpose of identifying the source of unauthorized duplication of Type B VOD programming for commercial profit purposes.

Video play unit 65 is one of 4 shown but one of 72 provided for each fiberoptic fiber, each of which has a capacity of carrying 3 Type B programs to a local library as previously said, each program being played on 24 video play units 65, each play unit starts the play of the program 5 minutes after the start of the previous unit thus providing the user the opportunity to effectively pause or replay the program from 5 minutes to 120 minutes after initial playing has begun on the first of said video play units. Each of the plurality of video play units 65 feeds one of a plurality of vertical blanking interval (VBI) data inserters 66. The output of each of the plurality of VBI data inserters are provided to insert information into the vertical blanking interval of the played program. The inserted VBI information identifies the time and date of the transmission and the identity of the local library to which the program is being transmitted for subsequent distribution to local neighborhood community users. Each of the plurality of VBI data inserters 66 feeds one of a plurality of character generators 67. The character generators are provided to insert information into the visible video of the played program. The inserted video information identifies the time and date of the transmission and the identity of the local library to which the program is being transmitted for subsequent distribution to local neighborhood community users. Said information is distributed throughout the program so as to be difficult to remove without deleting valuable program information. Either the VBI data inserter or the character generator may be deleted. It is desirable but not necessary to incorporated both deterrent methods.

Figure 5:
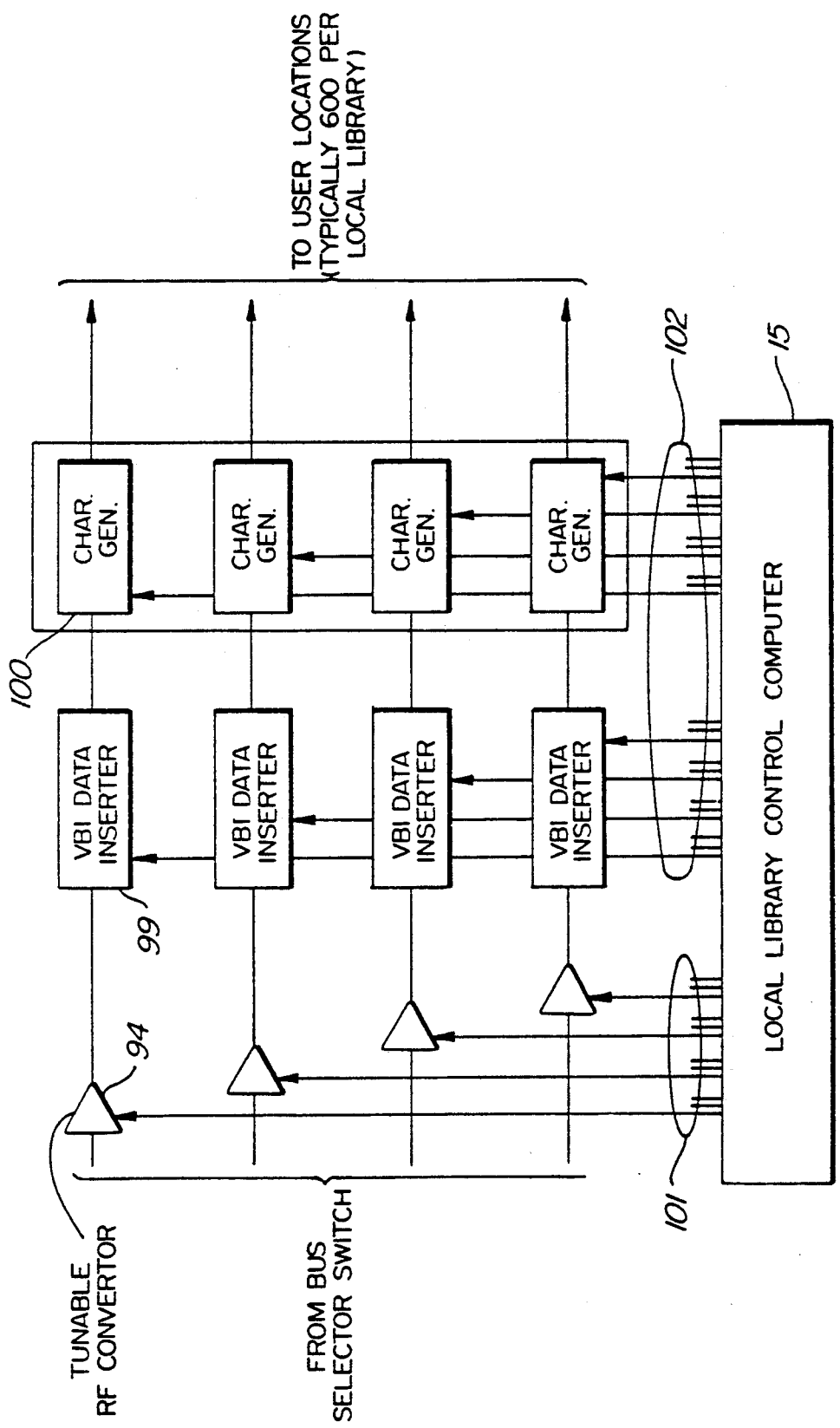
FIG. 5 is a functional block diagram that shows a location for the insertion of the copy deterrent information which inserts an identification code unique for each user's physical location.

FIG. 5 shows the local library apparatus for inserting identification information for the purpose of identifying the source of unauthorized duplication of Type B VOD programming for commercial profit purposes. This apparatus enhances the copy protection information provided by the central library disposed equipment described in relation to FIG. 5 as it identifies the specific user location to which the programming is being transmitted compared to the identification of only the local library to which the programming is being distributed. When Type B VOD programming is selected for distribution to one of a plurality of user locations by the bus selector switch 91 in FIG. 7, 72 channels of Type B programming is switched through the bus selector switch from one of a plurality of Type B buses 54 to a tunable frequency converter 94. The Local Control Computer 14, that also controls the bus selector switch 91 via control path 93 in FIG. 7, addresses the tunable RF converter that is provided on a dedicated basis to the ordering user location and transmits digital tuning information via control path 101 in FIG. 5 to the addressed converter 94. The RF television channel that has been ordered by said ordering user is tuned to and demodulated, the demodulated video output of which is input to a dedicated VBI data inserter 99 which inserts time, date and user location identification information throughout the vertical blanking interval of the video signal. The output of said VBI data inserter is connected to the dedicated character generator 100 which inserts time, date and user location identification information throughout the visible portion of the video signal. Said information is distributed throughout the program so as to be difficult to remove without deleting valuable program information. As is the case in the apparatus shown in FIG. 4 either the VBI data inserter or the character generator may be deleted. It is desirable but not necessary to incorporate both deterrent methods.

Figure 6:
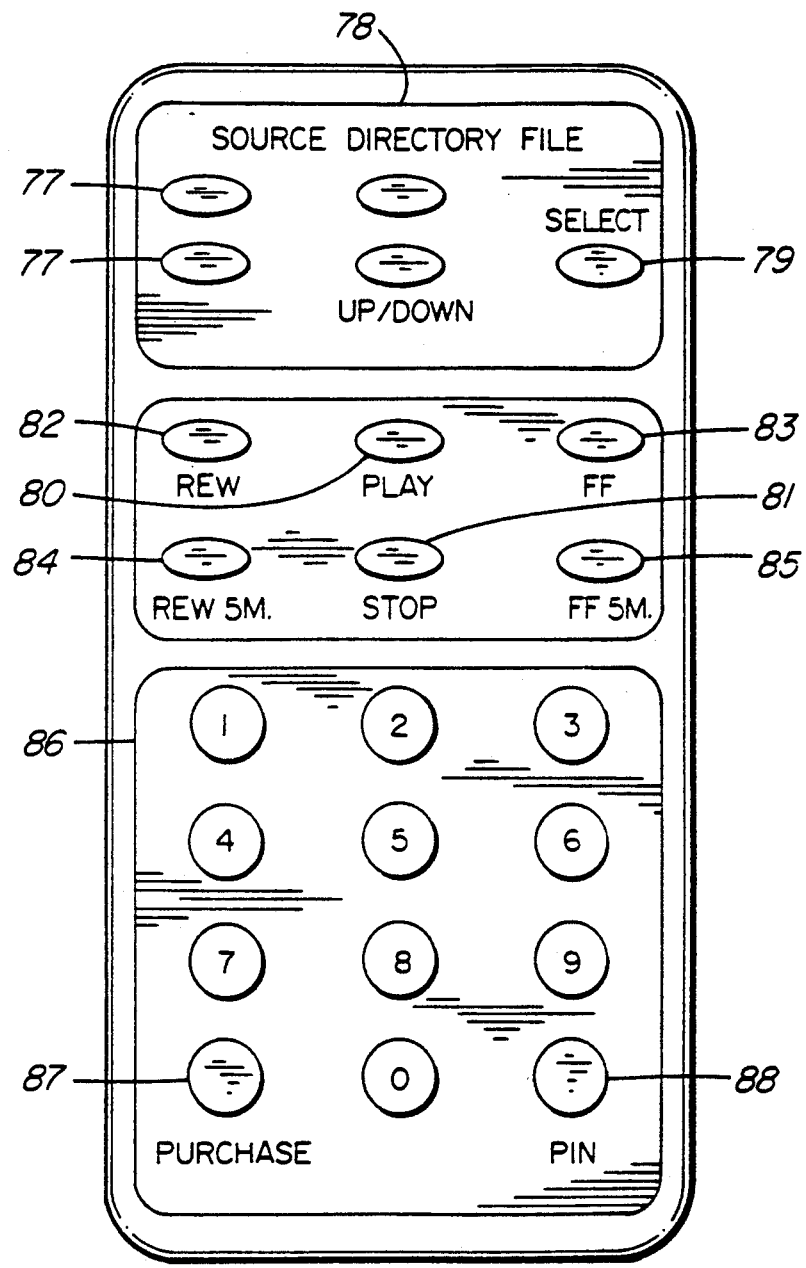
FIG. 6 shows a wireless remote control transmitter used to provide users with, library control and access functions, including the ability to place orders for programs and consumer goods.

The wireless remote control shown in FIG. 6 is provided for the purpose of providing the user with a user friendly apparatus for requesting programming directory information and, possibly, consumer goods as well. By pressing source button 77 the user can transmit to the local library a request to access any one of a plurality of video distribution buses. Two Source buttons are shown, one for toggling upward through the available buses and the other for toggling downward through the available buses.

A user may review a listing of the available programming offered on the selected bus by pressing one of the two directory buttons 78. Subsequent pressing of the Up Directory button permits the user to scroll upward through the directory of offered programming and by pressing the Down Directory button permits the user to scroll back down through the directory listing for the selected bus. The program listed in the middle of the directory listing shown on the TV screen is highlighted on said screen for the purpose of identifying the program that would be ordered should the user press the File Select button 79 at that time.

When the user has requested Type "A" VOD programming, pressing the Play button 80 initiates the start of the playing of the previously selected program. Similarly pressing the Stop button 81 halts the play operation. Pressing the Rewind button 82 permits the user to rewind the played program, the amount rewound depends on the amount of time that the user has the rewind button depressed. Similarly the pressing of the Fast Forward button 83 permits the user to fast forward through the selected program.

Should the user have selected a Type B VOD program, pressing the Rewind 5 min. button 84 results in the user's dedicated tunable RF converter 94 being re-tuned to an RF TV channel delivering the selected programming but delayed 5 minutes relative to the previously selected channel. Subsequent pressing of the Rewind 5 minute button permits the user to jump back an additional 5 minutes, etc. Similarly pressing the Fast Forward button 85 permits the user to jump forward to an RF TV channel which is also carrying the selected program but the playing of which is 5 minutes ahead of the previously selected RF channel.

The ten digit keypad 86 is provided for the purpose of permitting the user to input a Personal Identification Number or PIN number. The insertion of the PIN number permits the user to order consumer goods, said consumer goods being advertised on a consumer goods advertising channel. Said advertising channel being distributed on one of the plurality of Type C Cable TV buses 58 (although alternatively it may be transmitted to the local library 2 from a central source by satellite, coaxial cable or fiberoptic cable and distributed on a fifth bus type).

The transmission of said PIN number also permits the user to have the payment for said ordered goods authorized to be charged to a previously approved line of credit or credit card. By pressing the Purchase button 87 the ordering of the advertised goods, seen at the instant that said goods are visible on said ordering user's TV receiving apparatus screen 21, is initiated. Upon reception of such a request the local control computer 15 switches the video signal then being delivered to the user to the Directory or D Bus, the D Bus 92 is shown in FIG. 6 as is the Bus Selector Switch 91 and the local control computer 15. The Local Control Computer, transmits a text message to a previously idle D Bus RF television channel, switches said ordering user's bus selector switch to the D Bus, tunes said ordering user's RF frequency converter to said previously idle RF television channel, for the purpose of transmitting a request to said ordering user's television receiving apparatus. Said request asks said ordering user to enter said PIN number. Should a valid PIN number be entered within a specified time period the Local Control Computer 15 then transmits a series of messages to the purchasing user's TV 21 that asks the user to identify, using the keypad 86, the credit card type, credit card expiry data and credit card number to which the purchase is to be charged. Upon receipt of the required information the control computer then transmits a text description of the product ordered and requests the purchaser to confirm the product ordered by pressing the Purchase button 87 for a second time. Alternately should the Stop button 81 be pressed the order is cancelled. The Local Control Computer 15 then transmits all required ordering information to the central Master Computer and Billing Computer 8 for order processing.

Figure 7:
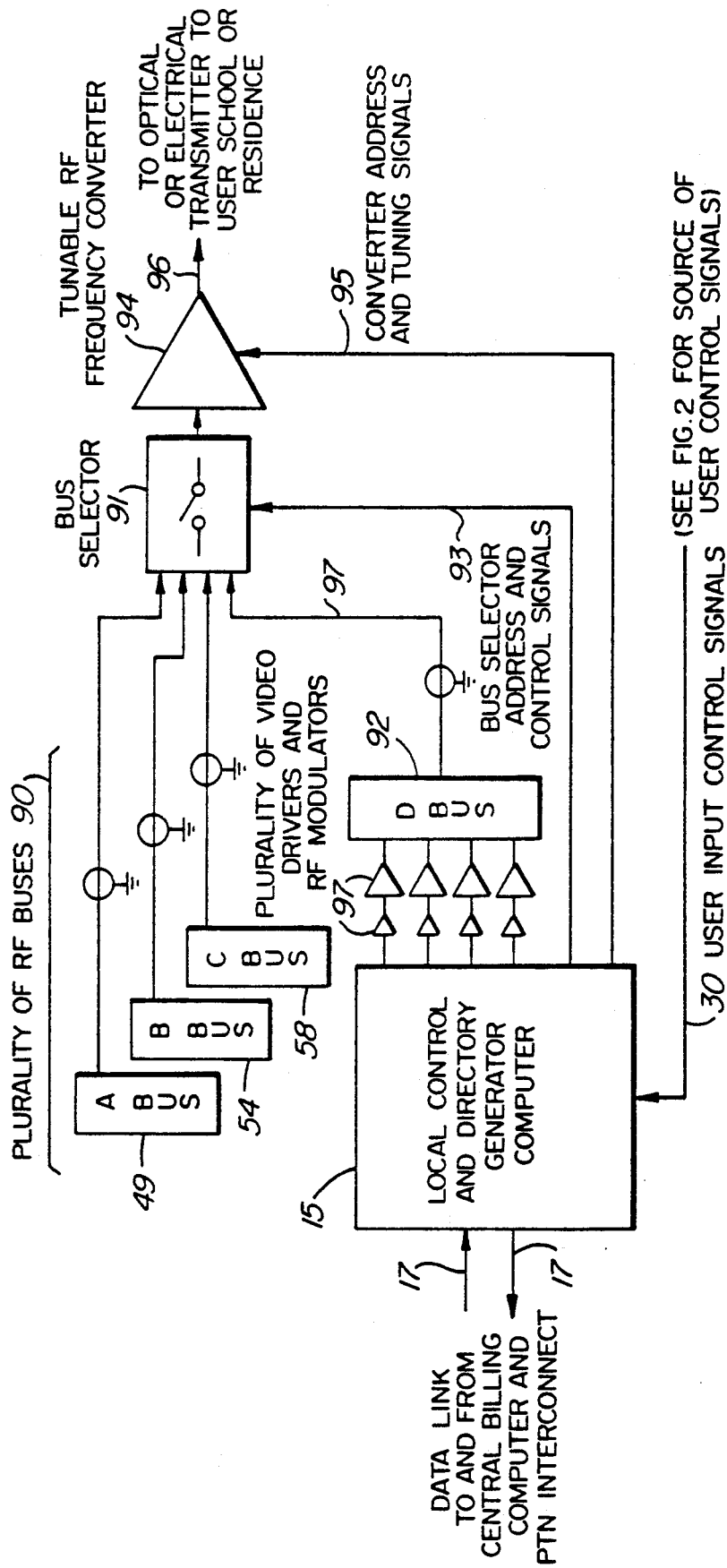
FIG. 7 is a functional block diagram that shows, apparatus for permitting the user to have user controlled selection of any of a large plurality of channels distributed on a plurality of buses each of which can carry as many RF television channels as can be offered by a cable TV operator using conventional technology, and apparatus provided for the purpose of generating text information, such as directory of offered programming information and consumer product ordering information, in response to each users request and control signal input.

FIG. 7 shows apparatus for permitting the user to have user controlled selection of any of a large plurality of channels. A plurality of buses are shown, each of which carries a plurality of radio frequency, frequency division multiplexed television channels. Each bus typically would have a capacity of 72 of such channels, which is a typical maximum number of channels that could be delivered by a cable TV operator using conventional cable TV delivery apparatus. Although only one of each of the Type A Video-on-Demand Bus 49 and one Type B Video-on-Demand Bus 54 are shown, and only one Type C Cable TV Bus 59 and one Type D Directory Bus 92, it is understood from the earlier disclosure in relation to this invention that, typically, there would be employed a plurality of each bus in use at each local library 2.

User input control signals are transmitted to the Local library Control Computer 15, which performs functions as a directory generator, on a plurality of signal paths 30 as previously embodied in FIG. 2. The local library control computer 15 reacts to a user request for a specific bus and program by addressing the dedicated bus selector switch 91 which is provisioned for the requesting user's location, by transmitting to that selector switch via control path 93 instructions for it to connect the appropriate bus to the digitally tunable RF television channel frequency converter 94. The switching technology used may be any of the methods described in Bradley et al. in U.S. Pat. No. 4,878,245.

Also shown in FIG. 7 is the apparatus provided for the purpose of generating text information, such as the previously referred to directory of offered programming, and consumer product ordering information and prompts. Said directory of offered programming information is transmitted in response to user control and is typically different from text information being delivered to other users at the same time. Said text information being displayed on the user's TV screen. Said text information is converted from data format to video format and modulated onto one of a plurality of RF television channels by one of a plurality of video drivers and modulators 92. Said RF television channels are frequency division multiplexed onto one of a plurality of directory or D Buses 92. Said D Bus output is amplified and split into 600 separate outputs, one of which is applied via signal path 97 to each of the bus selectors 91 dedicated to an end user location. Bus selection is controlled by control signal path 93, and RF channel selection is controlled by turning signal path 95. The ordered program is transmitted to an RF modulator, baseband audio and video amplifiers or photonic transmitter via signal path 96 for subsequent transmission to the user's location as shown in FIG. 2.

It will be understood that various modifications will occur to those skilled in the art without departing from the inventive concept, whose scope it is desired to define only by the appended claims.

We claim:

1. A secure, hierarchial, video-on-demand television signal distribution network comprising:
    at least one local community library serving a plurality of geographically proximate subscribers, each community library providing at least one video distribution bus for attachment of a plurality television channel tuners, one tuner for each subscriber, to tune a selected television channel on said video distribution bus for delivery of the tuned television signal over dedicated television signal delivery lines to the subscriber, each said library having: a plurality of television program record and playback units for recording television programming and playing back previously stored television programming, each television program record and playback unit provided with a channel tuner for tuning a television channel to be recorded and further provided with a tuneable television signal modulator for modulating the playback television signal to a selectable channel, each modulator terminated on said video distribution bus;
    a user control signal path for carrying user selection and control data from the subscriber premises to the local community library whereby the user programming choices and control may be acted on by the local library in response to user input to select or control the television signal to be delivered or being delivered to the user over the dedicated television signal delivery line serving the user;
    a central library serving said local libraries having at least one wide bandwidth television signal delivery link extending therebetween for delivery of television programming to said local libraries for storage on said program record and playback units, further including a control data communications path extending between said central library and each said local library whereby user selections of video programs to be recorded at said local library may be effected co-operatively by the central and local library.

2. A secure, hierarchial, video-on-demand television signal distribution network as claimed in claim 1 wherein said user control signal path is selected from one of:
    (a) a touch tone telephone connected to the public switched telephone network;
    (b) a wireless receiver connected to a dedicated copper path extending between the local library and the user premises.

3. A secure, hierarchial, video-on-demand television signal distribution network as claimed in claim 2 wherein said wireless receiver produces signalling on said user control signal path in response to received infra red signalling.

4. A secure, hierarchial, video-on-demand television signal distribution network as claimed in claim 2 wherein said wireless receiver produces signalling on said user control signal path in response to received radio frequency signalling.

5. A secure, hierarchial, video-on-demand television signal distribution network as claimed in claim 1 wherein said subscriber channel tuner includes means for encoding user identification information in the tuned television signal delivered to said subscriber to deter the copying of said television signal.

6. A secure, hierarchial, video-on-demand television signal distribution network as claimed in claim 1 wherein said central library includes means for producing television programming with at least one source selected from:
    (i) an equal access point apparatus adapted to receive television program signalling from creators of television programming to permit distribution of such programming over the network;
    (ii) program playback units containing multiple copies of a video program arranged to repeatedly playback said video program a predetermined time intervals;
    (iii) video image production means for producing a directory of available video programming.

7. A secure, hierarchial, video-on-demand television signal distribution network comprising:
    at least one local community library serving a plurality of geographically proximate subscribers, each community library providing at least one input video distribution bus for attachment of a plurality of television program record and playback units for recording television programming and playing back previously stored television programming, each television program record and playback unit provided with a channel tuner for tuning a television channel to be recorded on said input video distribution bus and further provided with at least one output video distribution bus, each said television program record and playback unit further provided with a tuneable television signal modulator for modulating the playback television signal to a selectable channel, each modulator terminated on said output video distribution bus;
    a bus selector switch for connecting a television channel tuner to either said input video distribution bus or said output video distribution bus, one tuner for each subscriber, to tune a selected television channel on a selected video distribution bus for delivery of the tuned television signal over dedicated television signal delivery lines to the subscriber, a user control signal path for carrying user selection and control data from the subscriber premises to the local community library whereby the user programming choices and control may be acted on by the local library in response to user input to select or control the television signal to be delivered or being delivered to the user over the dedicated television signal delivery line serving the user;

a central library serving said local libraries having at least one wide bandwidth television signal delivery link extending therebetween for delivery of television programming to the input video distribution bus of said local libraries further including a control data communications path extending between said central library and each said local library;

whereby user selections of video programs may be made to:
 (i) be recorded by the record and play back units at said local library by co-operative data communications between the central and local library over said control data communications path;
 (ii) be delivered from a user selected play back unit via said bus selector switch and tuner at said local library over said dedicated television signal delivery line under play, pause, rewind, fast-forward, stop control of the user as communicated to the local library over said user control signal path;
 (iii) be delivered by a user selected channel on said input video distribution bus from said central library via said bus selector switch and tuner at said local library over said dedicated television signal delivery line.

8. A secure, hierarchial, video-on-demand television signal distribution network as claimed in claim 7 wherein said user control signal path is selected from one of:

(a) a touch tone telephone connected to the public switched telephone network;
 (b) a wireless receiver connected to a dedicated copper path extending between the local library and the user premises.

9. A secure, hierarchial, video-on-demand television signal distribution network as claimed in claim 8 wherein said wireless receiver produces signalling on said user control signal path in response to received infra red signalling.

10. A secure, hierarchial, video-on-demand television signal distribution network as claimed in claim 8 wherein said wireless receiver produces signalling on said user control signal path in response to received radio frequency signalling.

11. A secure, hierarchial, video-on-demand television signal distribution network as claimed in claim 7 wherein said subscriber channel tuner includes means for encoding user identification information in the tuned television signal delivered to said subscriber to deter the copying of said television signal.

12. A secure, hierarchial, video-on-demand television signal distribution network as claimed in claim 7 wherein said central library includes means for producing television programming with at least one source selected from:
 (i) an equal access point apparatus adapted to receive television program signalling from creators of television programming to permit distribution of such programming over the network;
 (ii) program playback units containing multiple copies of a video program arranged to repeatedly playback said video program a predetermined time intervals;
 (iii) video image production means for producing a directory of available video programming.

* * * * *